Sept. 29, 1942.   K. PRITSCHOW   2,297,634
PHOTOGRAPHIC CAMERA
Filed Jan. 12, 1939   2 Sheets-Sheet 1

Inventor:
Karl Pritschow
by Frank Reichow
Attorney

Sept. 29, 1942.                K. PRITSCHOW                 2,297,634
                              PHOTOGRAPHIC CAMERA
                              Filed Jan. 12, 1939           2 Sheets-Sheet 2
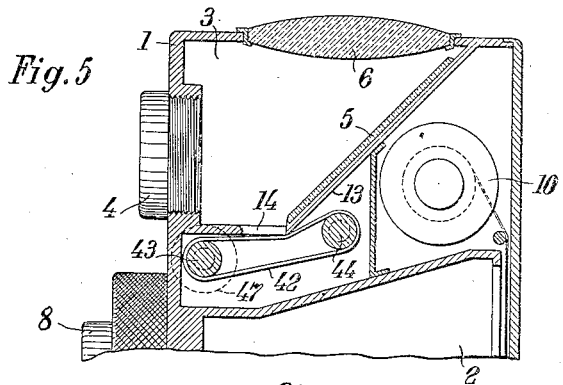
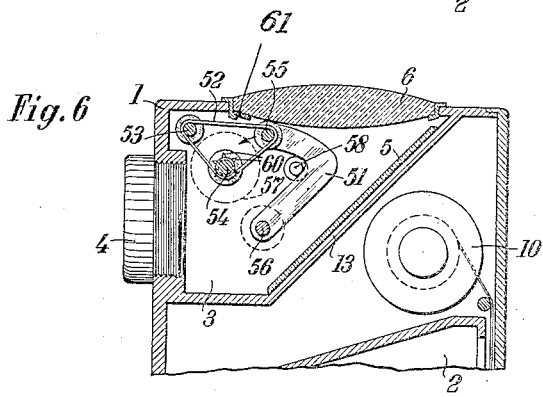
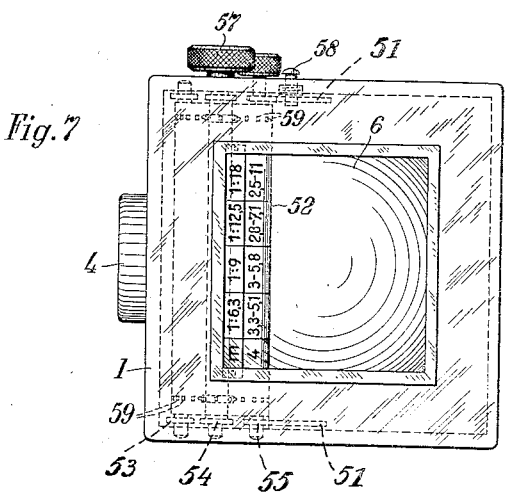
Inventor:
Karl Pritschow
by Franz Reinhold
Attorney Patented Sept. 29, 1942

2,297,634

UNITED STATES PATENT OFFICE 2,297,634

PHOTOGRAPHIC CAMERA

Karl Pritschow, Brunswick, Germany, assignor, by mesne assignments, to Sherka Chemical Co. Inc., Bloomfield, N. J., a corporation Application January 12, 1939, Serial No. 250,540
In Germany November 2, 1936

3 Claims. (Cl. 95—44)

My invention relates to improvements in photographic cameras, and more particularly in cameras provided with a table showing the depths of definition or the ranges within which objects are sharply reproduced on the sensitized surface for given distances of the objects and lens apertures. The object of the improvements is to provide a camera of this type in which the values showing the said ranges may be readily read while the photograph is being taken or the camera is set in position by means of the view finder. With this object in view my invention consists in placing the said table in such a position that it can be read while the image is being set on the focussing screen of the view finder. Thus, where the finder is arranged so as to be inspected from above the said table is arranged at the top part of the camera and with its surface directed upwardly. In cameras now in use the values indicating the depths of definition are disposed in several columns and lines, and therefore it is difficult to find the correct value. In my improved camera the table is arranged so that only a single line is visible at a time, the values of each line corresponding to a definite range of the object and to the different lens apertures. In a practical embodiment the lines of the table are arranged on the side faces of a rotatably mounted polygonal drum which are selectively brought into the position in which they can be inspected, or on an endless band the lines of which are successively brought into position at the rear of a slot. The mechanism for moving the said drum or endless band is preferably connected with the mechanism for setting the object lens for focussing.

Figure 3:
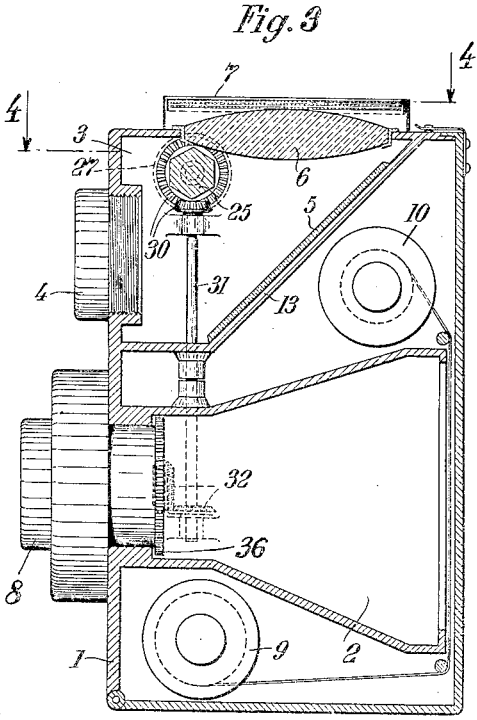
Figure 4:
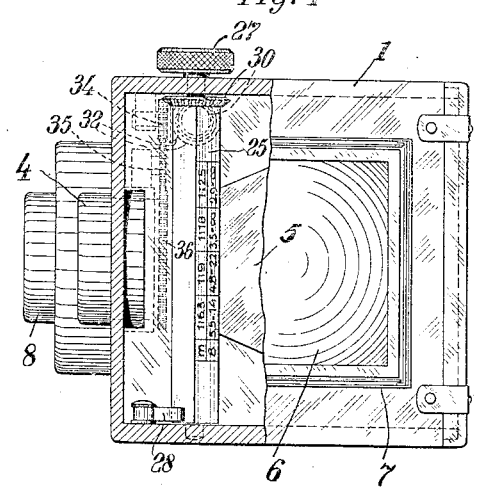

For the purpose of explaining the invention several examples embodying the same have been shown in the accompanying drawings in which the same reference characters have been used in all the views to indicate corresponding parts. In said drawings, Fig. 1 is a sectional elevation showing a camera having a view finder arranged above the exposure chamber and provided with a polygonal drum having the lines of the table of the depths of definition printed on its side faces, the said drum being located below the object lens of the finder, Fig. 2 is a sectional plan view taken on the line 2—2 of Fig. 1, Fig. 3 is a sectional elevation similar to the one illustrated in Fig. 1 and showing a modification in which the said polygonal drum is located above the object lens of the finder and immediately below the front part of the field lens thereof, Fig. 4 is a sectional plan view taken on the line 4—4 of Fig. 3, Fig. 5 is a fragmentary sectional elevation showing the top part of a camera similar to the one illustrated in Figs. 1 and 2, the said table being provided on an endless band located below the finder, Fig. 6 is a fragmentary sectional elevation similar to the one illustrated in Fig. 5 and showing modification in which the endless band is located above the object lens of the view finder, and Fig. 7 is a top plan view of Fig. 6.

Figure 1:
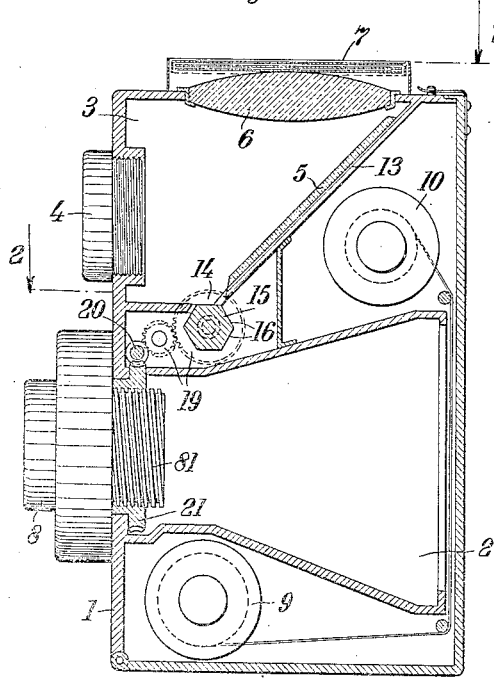
Figure 2:
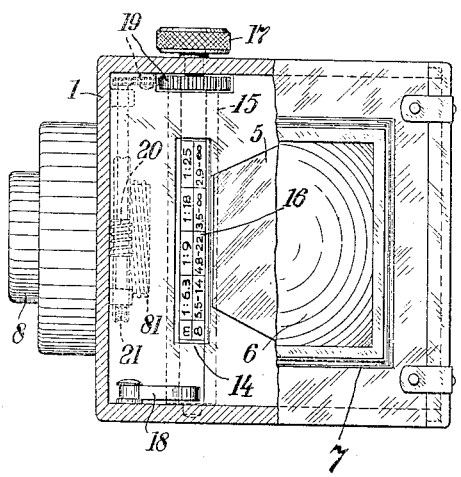

Referring at first to the example shown in Figs. 1 and 2, the camera comprises a body 1 having an exposure chamber 2, an object lens 8, and a finder chamber 3 having an object lens 4 and a field lens 6. The sensitized film is wound on spools 9 and 10. The finder chamber is provided with an angularly disposed rear wall 13 having a mirror 5 mounted thereon, the said mirror being adapted to direct the rays passing through the object lens 4 upwardly and through the fields lens 6. While the camera is out of use the said lens is protected by the side walls 7 of the hood folded thereon. At the bottom end of the inclined rear wall 13 the finder chamber is provided with a transverse slot 14, and below the said slot a polygonal drum 15 is mounted in the side walls of the camera casing 1, the said polygonal drum having a table 16 having the ranges of sharp reproduction or depths of definition printed on its side faces. At one end the shaft of the said drum carries a milled disk 17 by means of which the drum may be rotated for setting one of the side faces into position below the slot 14, a leaf spring 18 being provided for holding the drum in the set positions. Preferably the drum 15 is connected with the focussing mechanism of the object lens 8, and as shown the said mechanism comprises a train of gear wheels 19, a worm 20 and a worm gearing 21 formed with internal screw threads engaging a sleeve 81 connected with the lens tube. Mechanism for thus shifting the object lens 8 in axial direction is known in the art, and I deem it not necessary to describe the same in detail.

Fig. 2 shows two lines of figures of the table 16 printed on one of the side faces of the drum 15, and it will be understood that the other side faces have similar lines printed thereon, each corresponding to a particular range to which the object lens has been set. Thus the side face shown in Fig. 2 has the value $m8$ printed on its first or left hand column, the said figures indicating the range of the object which is 8 meters. In the next columns the lens aperture 1:6.3 has been indicated, and below the said indictaion the range of definition has been indicated, the figures 5.5 to 14 indicating that if the lens has been set to a range of 8 meters and the lens aperture is 1:6.3, a sufficiently sharp image is produced when the distance of the object is not less than 5.5 meters and not more than 14 meters. In a similar way the lens apertures 1:9, 1:18, 1:25 and the corresponding ranges 4.8–22, 3.5–∞ and 2.9–∞ have been printed in the following columns. In a similar way on the other sides of the polygon the lines of the tables corresponding to other ranges have ben printed.

In the practical use of the camera the object lens is set by means of the milled disk 17 in accordance with the distance of the object. Thereby the line of the table corresponding to the said distance and indicating the same in its left hand column, for example the line carrying the indication m8, appears in the slot 14, the polygon being held in this position by the spring 18. Now the camera is directed towards the object, and the said object is viewed through the view finder. From the construction shown in Fig. 1 it will be understood that the image appears sharp in the finder independently of the distance of the object. While the photographer directs the finder towards the object he is able to read the indications on the uppermost side 16 of the polygon 15. The said indications are read through the lens 6, and therefore the figures appear enlarged.

In Figs. 3 and 4 the construction of the camera is the same as has been described with reference to Figs. 1 and 2, and the same reference characters have been used to indicate corresponding parts. The drum 25 carrying the table is mounted above the object lens 4 of the finder and immediately below the front end of the field lens 6. Its shaft carries a milled disk 27, and it is held in set position by a spring 28. The drum is connected with the mechanism for setting the object lens 8 through a bevel gear 30, a spindle 31, a bevel gear 32, a spur gear 34 and a spur gear 35 meshing with gear teeth 36 provided on the lens tube. Thus the drum 25 may be rotated either by means of the milled disk 27 or by rotating the lens tube 8.

In the modification shown in Fig. 5 the table 16 is mounted on an endless tape 42 located below the slot 14 and the object lens 4 of the view finder, the said tape being trained on rollers 43 and 44 mounted in the side walls of the camera casing 1. The axle of the roller 43 carries a milled disk 47 by means of which the line of the table corresponding to the distance of the object is brought into position below the slot 14.

In the construction shown in the figure the rollers 43, 44 are not connected with the mechanism for setting the object lens 8, and therefore the table is set into position independently of the said object lens. But I wish it to be understood that my invention is not limited to this feature and that mechanism similar to the one shown in Fig. 1 or Fig. 3 may be provided for connecting the roller 43 with the setting mechanism of the object lens.

In Figs. 6 and 7 I have shown another modification in which the endless tape 52 on which the table 16 is printed is located above the lens 4 and immediately below the field lens 6. As shown the said tape is trained on rollers 53, 54 and 55, and the shafts of the rollers are mounted in the side walls of the camera casing 1, while the shaft of the roller 55 is mounted on arms 51 pivotally mounted in the side walls of the camera casing at 56. One of the pivot bolts 56 carries a milled disk 57 by means of which the arm 51 may be turned to the left in Fig. 6 for removing the tape 52 away from the field lens 6. For fixing the arms 51 in position a spring pressed pin 58 is slidably mounted in the side wall of the camera casing. The tape 52 is foraminated at both ends as is shown at 59, and the said foraminated portions are engaged by prongs 60 carried by the roller 54.

The operation of the apparatus shown in Figs. 6 and 7 is similar to the one described with reference to Figs. 1 and 2, the tape being set with one of its lines, for example the line m4 in operative position, by means of the milled disk 17.

Also in the construction illustrated in Figs. 6 and 7 the tape 52 is not shown to be connected with the mechanism for setting the object glass 8. But I wish it to be understood that my invention is not limited to this feature.

In the construction shown in Figs. 6 and 7 only one of the pair of lines of the table corresponding to the ranges has been printed on the tape, and the line containing the letter m and the lens apertures is printed on a cleat 61 fixed to the top of the body 1.

I claim:

1. In a photographic camera comprising a casing having an exposure chamber and a finder chamber located above said exposure chamber, said finder chamber being provided with an object lens, a mirror in position for reflecting rays passing through said object lens upwardly, and a field lens above said mirror, the invention herein described which consists of a movable carrier having a table showing depths of definition printed thereon, said carrier being located within the finder chamber adjacent the pencil of rays passing from said object lens of the finder towards said mirror and in position for permitting inspection of one of its lines at a time through said field lens, and means for moving said carrier with any one of its lines into position permitting inspection through said field lens.

2. In a photographic camera, comprising a casing having an exposure chamber and a finder chamber located above said exposure chamber, said finder chamber being provided with an object lens, a mirror in position for reflecting rays passing through said object lens upwardly, and a field lens above said mirror, the invention herein described which consists of a movable carrier having a table showing depths of definition printed thereon, said carrier being located above the pencil of rays passing from said object lens of the finder towards said mirror and in position for permitting inspection of one of its lines at a time through said field lens, and means for moving said carrier with any one of its lines into position permitting inspection through said field lens.

3. In a photographic camera comprising a casing having an exposure chamber and a finder chamber located above said exposure chamber, said finder chamber being provided with an object lens, a mirror in position for reflecting rays passing through said object lens upwardly, and a field lens above said mirror, the invention herein described which consists of a depth of focus indicator that includes a slot in the wall of the finder chamber at the lower edge of said mirror and a carrier movable beneath and transversely of such slot, said carrier being provided with a succession of lines of data extending line after line in a direction transverse to the direction of carrier movement.

KARL PRITSCHOW.